United States Patent
Shimizu et al.

(10) Patent No.: US 7,330,622 B2
(45) Date of Patent: Feb. 12, 2008

(54) LAMINATED OPTICAL WAVEGUIDE FILM, METHOD OF PRODUCING THE SAME, AND OPTICAL WAVEGUIDE MODULE

(75) Inventors: Keishi Shimizu, Ashigarakami-gun (JP); Shigemi Ohtsu, Ashigarakami-gun (JP); Kazutoshi Yatsuda, Ashigarakami-gun (JP); Eiichi Akutsu, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 120 days.

(21) Appl. No.: 11/172,962

(22) Filed: Jul. 5, 2005

(65) Prior Publication Data
US 2006/0008224 A1  Jan. 12, 2006

(30) Foreign Application Priority Data
Jul. 6, 2004  (JP)  .............................. 2004-199514

(51) Int. Cl.
G02B 6/10  (2006.01)

(52) U.S. Cl. ...................................... 385/129; 385/131
(58) Field of Classification Search ......... 385/114–132
See application file for complete search history.

(56) References Cited

U.S. PATENT DOCUMENTS 6,850,671 B2 *  2/2005  Carnevale et al. ............ 385/39
6,947,671 B2 *  9/2005  Sekiya et al. ................. 398/86

* cited by examiner

Primary Examiner—Kevin S. Wood
(74) Attorney, Agent, or Firm—Oliff & Berridge, PLC

(57) ABSTRACT

The invention provides a laminated optical waveguide film in which a plurality of waveguide cores are formed, and a plurality of end surfaces at which the waveguide cores are exposed are formed, wherein, among the plurality of end surfaces, a first end surface has waveguide core end surfaces laminated in a thickness direction, and a second end surface has waveguide core end surfaces arranged in parallel. The invention also provides a method for producing the optical guide film, and an optical module using the optical guide film.

14 Claims, 6 Drawing Sheets

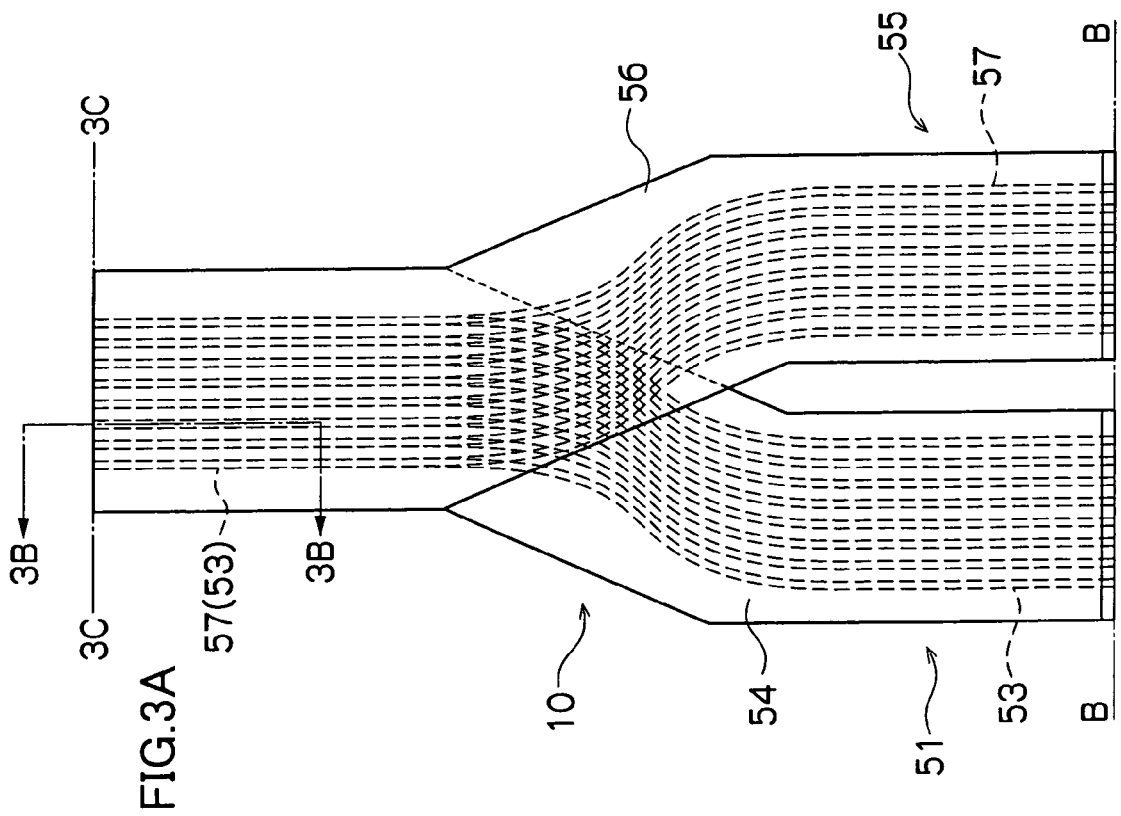
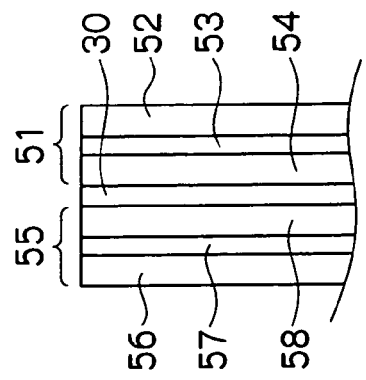
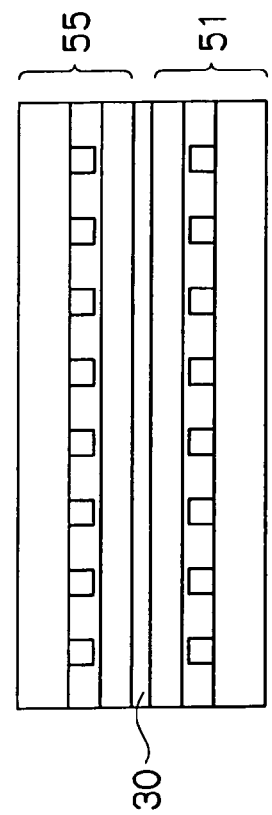
FIG.3A
FIG.3B
FIG.3C

LAMINATED OPTICAL WAVEGUIDE FILM, METHOD OF PRODUCING THE SAME, AND OPTICAL WAVEGUIDE MODULE

CROSS-REFERENCE TO RELATED APPLICATION

This application claims under 35 USC 119 from Japanese Patent Application No. 2004-199514, the disclosure of which is incorporated by reference herein.

BACKGROUND OF THE INVENTION

1. Field of the Invention

The present invention relates to a laminated optical waveguide film, a method of producing the same, as well as an optical waveguide module using the laminated optical waveguide film.

2. Description of the Related Art

As a method of producing a polymer optical waveguide, (1) a method of impregnating films with a monomer, selectively exposing a core part to light to change a refractive index, and laminating the films (selective polymerization method), (2) a method of coating a core layer and a clad layer, and forming a clad part using reactive ion etching (RIE method), (3) a method using a photolithographic method in which exposure and developing are performed using an ultraviolet-ray curable resin in which a photosensitive material has been added to a polymer material (direct exposure method), (4) a method utilizing injection molding, and (5) a method of coating a core layer and a clad layer, and exposing a core part to light to change a refractive index of the core part (photobleaching method) have been proposed.

The selective polymerization method of (1) has a problem with respect to lamination of films.

Methods of (2) and (3) have a high cost due to use of a photolithographic method. The method of (4) has a problem with respect to precision of the resulting core diameter. In addition, the method of (5) has a problem that a sufficient difference in refractive index between a core layer and a clad layer cannot be realized.

Currently, practical methods excellent in performance include only the methods of (2) and (3), but these methods have a problem with respect to a cost as described above. Further, none of the method of (1) to (5) is suitable for forming a polymer optical waveguide on a flexible plastic substrate having a large area.

In contrast, as a method entirely different from the aforementioned conventional methods of producing a polymer optical waveguide, the present inventors invented and filed application for a method of producing a polymer optical waveguide by using a mold as shown in Japanese Patent Application Laid-Open (JP-A) No. 2004-29507, JP-A No. 2004-86144, and JP-A No. 2004-109927.

This method can mass-produce a polymer optical waveguide, extremely simply and at a low cost. In addition, although this is a simple method, it is possible to manufacture a polymer optical waveguide having little waveguide loss, and it is possible to simply manufacture a polymer optical waveguide having any pattern shape as long as a mold therefor can be manufactured. Further, it has enabled manufacture of an optical waveguide on a flexible substrate, which has previously been difficult.

Further, the present inventors previously filed an application for a method of forming a laminate-type polymer optical waveguide which was published as JP-A No. 2004-069742. If a polymer optical waveguide having a laminate structure can be realized, for example, light can be easily led to an optical fiber array of a type in which many optical fibers are laminated, and a large capacity data transmitting optical module can be easily manufactured.

As laminate-type polymer optical waveguides, those of JP-A No. 2000-39530 and JP-A No. 11-183747 are known. However, laminate-type polymer optical waveguides disclosed in these patent publications have a very complicated structure, it is necessary to embed a mirror or a lens in the polymer optical waveguide, and it is impossible to manufacture it at a low cost. In addition, also when a polymer optical waveguide and light receiving and emitting elements are laminated, it is necessary to perform positioning at a high precision, and a cost necessary for packaging has been a great problem.

Further, it is advantageous from the viewpoint of packaging density that an optical waveguide module is manufactured by combining a laminate-type polymer optical waveguide with a planer light emitting element, such as a vertical cavity surface emission laser (VCSEL), or a planer light receiving element. Moreover, when many elements are used, a transmission rate can be further improved. However, in order to combine VCSEL with a laminate-type optical waveguide, it is necessary to vertically package the VCSEL relative to a waveguide plane, or combine a 45° reflection mirror structure and a microlens as described in Japanese Patent No. 3062345. This is because distances between an optical element and a waveguide core are different depending on a number of lamination layers in the case of a laminate-type optical waveguide because of the existence of corresponding 45° mirrors, and effective coupling is impossible unless light is collimated. For this reason, it is necessary to arrange a microlens structure on a light emitting element side, resulting in higher costs. Further, in order to couple a light receiving element, a microlens structure becomes necessary at each core end surfaces, respectively. It is extremely difficult to incorporate this structure into an ordinary process for manufacturing a polymer waveguide, and moreover, this leads to higher cost. In the case of a structure other than this structure, a countermeasure for crosstalk is difficult, and this becomes a problem for realizing an optical module using such a planer packaging laminate waveguide structure.

SUMMARY OF THE INVENTION

A first aspect of the present invention is to provide a laminated optical waveguide film on which a plurality of waveguide cores are formed, and a plurality of end surfaces at which the waveguide cores are exposed are formed, wherein a first end surface, among the plurality of end surfaces, has waveguide core end surfaces laminated in a thickness direction, and a second end surface has waveguide core end surfaces arranged in parallel.

A second aspect of the invention is to provide a optical waveguide module in which a plurality of waveguide cores are formed, a plurality of end surfaces at which the waveguide cores are exposed are formed, among the plurality of end surfaces, a first end surface has a waveguide core end surfaces laminated in a thickness direction and a second end surface has waveguide core end surfaces arranged in parallel, and a planar light emitting element and/or a planar light receiving element is coupled to the second end surface.

A third aspect of the invention is to provide a method of producing the laminated optical waveguide film according to the first aspect, comprising:

preparing two ridge waveguides in which a waveguide core is formed on a clad film, arranging the two ridge waveguides so that the waveguide cores are opposed to each other and a gap therebetween is controlled, filling a curable resin having a refractive index identical or approximately equivalent to that of the clad film into the gap, and curing the filled clad curable resin.

A fourth aspect of the invention is to provide a method of producing the laminated optical waveguide film according to the first aspect, comprising:

preparing a plurality of embedded waveguides in which a waveguide core is formed between two clad films, arranging the plurality of embedded waveguides by controlling a gap on a lamination side thereof, filling a clad curable resin having a refractive index identical or approximately equivalent to that of the clad films into the gap on the lamination side, and curing the filled clad curable resin.

A fifth aspect of the invention is to provide a method of producing a lamination-type optical waveguide film according to the third aspect, comprising:

preparing a plurality of embedded waveguides in which a waveguide core is formed between two clad films, a vertical plane is formed at a lamination side end part, and an optical path conversion mirror is formed on parallel arranged side, arranging the plurality of embedded waveguides by controlling a gap on a lamination side thereof, filling a clad curable resin having a refractive index identical or approximately equivalent to that of the clad film into the gap on the lamination side, and curing the filled clad curable resin.

BRIEF DESCRIPTION OF THE DRAWINGS

Preferred embodiments of the present invention will be described in detail based on the following figures, wherein:

FIG. 3A is a plan view showing one example of a laminated optical waveguide film using an embedded waveguide;

FIG. 3B is an IIIB-IIIB cross-sectional view of FIG. 3A;

FIG. 3C is a view showing an IIIC-IIIC end surface of FIG. 3A;

DETAILED DESCRIPTION OF THE INVENTION

The laminated optical waveguide film of the present invention is a laminated optical waveguide film on which plural waveguide cores (hereinafter, simply referred to as "cores" in some cases) are formed, and plural end surfaces at which the cores are exposed are formed, wherein, among the plurality of end surfaces, a first end surface has waveguide core end surfaces laminated in a thickness direction, and a second end surface has waveguide core end surfaces arranged in parallel (hereinafter, referred to as "monolayer" in some cases). It is preferable that the second end surface is an optical path conversion mirror, and it is preferable that the first end surface is a vertical plane relative to the laminated optical waveguide film surface.

A case where there are two end surfaces at which cores are exposed will be explained below, but more end surfaces may be present. The invention is not limited to the following optical waveguide film.

As described above, in a laminated optical waveguide film on which two end surfaces at which cores are exposed are present, it is preferable that one end surface (first end surface) is a vertical plane at which core end surfaces are laminated in a thickness direction, and the other end surface (second end surface) is an optical path conversion mirror at which core end surfaces are arranged in parallel.

Two or more layers of cores are laminated, and the number of layers is not particularly limited. However, in the following explanation, an example in which two layers of cores are laminated will be explained.

The laminated optical waveguide film of the invention can be produced by laminating ridge waveguides in which a core is formed on a clad film (hereinafter, referred to as "ridge waveguide" in some cases), or laminating embedded waveguides in which a core is held between a (lower) clad film and an (upper) clad film (hereinafter, referred to as "embedded waveguide" in some cases).

First, a laminated optical waveguide film using ridge waveguides will be explained. FIG. 1 is one example of this type of laminated optical waveguide film. FIG. 1A shows a plan view thereof, FIG. 1B shows an IB-IB cross-sectional view at a lamination part, and FIG. 1C is a cross-sectional view showing an IC-IC end surface in FIG. 1A.

In FIG. 1A, numeral 10 represents a laminated optical waveguide film, 13 and 17 represent cores, and numeral 18 shows a clad film. An IC-IC end surface is a vertical plane at which core end surfaces are laminated in a thickness direction. A B-B end surface is an optical path conversion mirror at which core end surfaces are arranged in a monolayer. Although not shown, an optical path conversion mirror such as a 45° mirror plane is formed. In this example, at the IC-IC end surface, eight cores are laminated in two layers, and at a B-B end surface, sixteen cores are in one row.

Figure 1B:
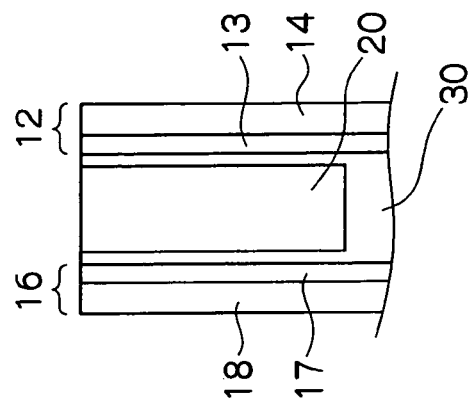
FIG. 1B is an IB-IB cross-sectional view of FIG. 1A.
Figure 1C:
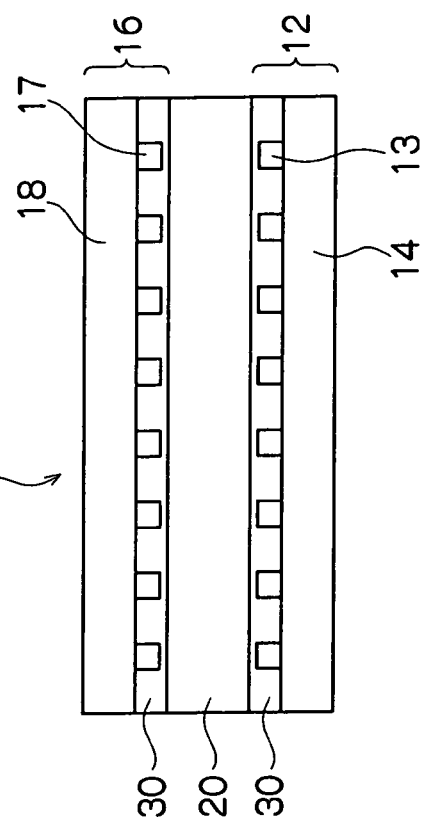
FIG. 1C is a view showing an IC-IC end surface of FIG. 1A.
Figure 1A:
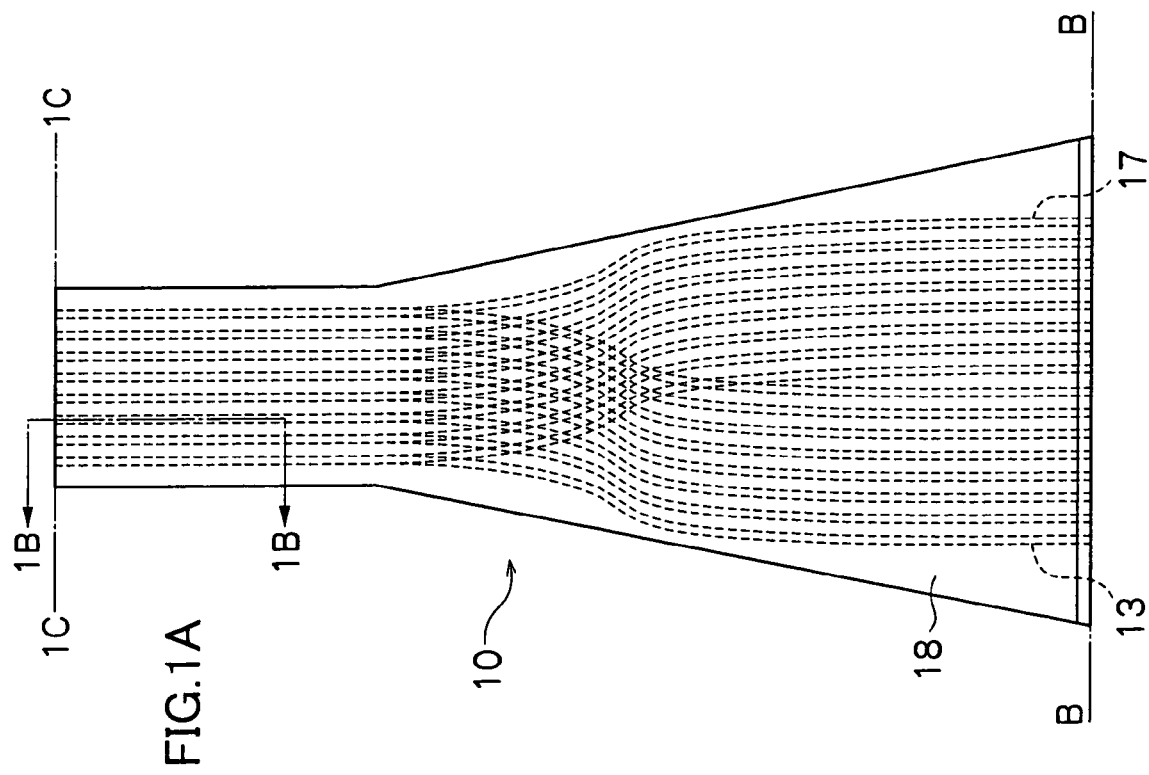
FIG. 1A is a plan view showing one example of a laminated optical waveguide film using a ridge waveguide.

In FIG. 1B, numeral 12 represents a lower ridge waveguide, and numerals 13 and 14 are a core and a clad film constituting the lower ridge waveguide 12, respectively. Numeral 16 represents an upper ridge waveguide, and 17 and 18 are a core and a clad film constituting the upper ridge waveguide, respectively. The lower ridge waveguide 12 is positioned at a lower part of a lamination part, and the upper ridge waveguide is positioned at an upper part of a lamination part. Numeral 20 is a spacer, and 30 represents an adhesive layer (clad curable resin) for adhesion between the lower and upper ridge waveguides (12,16) and the spacer 20, and between the ridge waveguides 12,16. The core 13 is led from a lower layer at the lamination part to a left side of the B-B end surface of FIG. 1A, and the core 17 is led to a right side of the B-B end surface of FIG. 1A.

At the IC-IC end surface, plural core layers are laminated at a prescribed pitch, and if this pitch becomes larger, when each ridge waveguide is laminated with an adhesive, an amount of the adhesive becomes larger and, accompanying this, shrinkage at curing becomes larger. Therefore, in such the case, it is effective to use a spacer in at least a part of a lamination structure part as shown in FIG. 1B. A spacer having the same optical property and mechanical property as those of a clad film is used.

In order to produce the laminated optical waveguide film shown in FIG. 1A to FIG. 1C, the two ridge waveguides (12,16) in which the waveguide cores (13,17) are formed on the clad films (14,18) are prepared, the two ridge waveguides (12,16) are arranged so that the waveguide cores (13,17) are opposed to each other and a gap is controlled, a clad curable resin having a refractive index identical or approximately equivalent to that of the clad film is filled into the gap, the filled clad curable resin is cured to make a laminate waveguide, thereafter, an end part at which the waveguide cores of the laminate waveguide are laminated is formed on a vertical plane, and an optical path conversion mirror is formed at an end part at which the waveguide cores are arranged in parallel.

Figure 2:
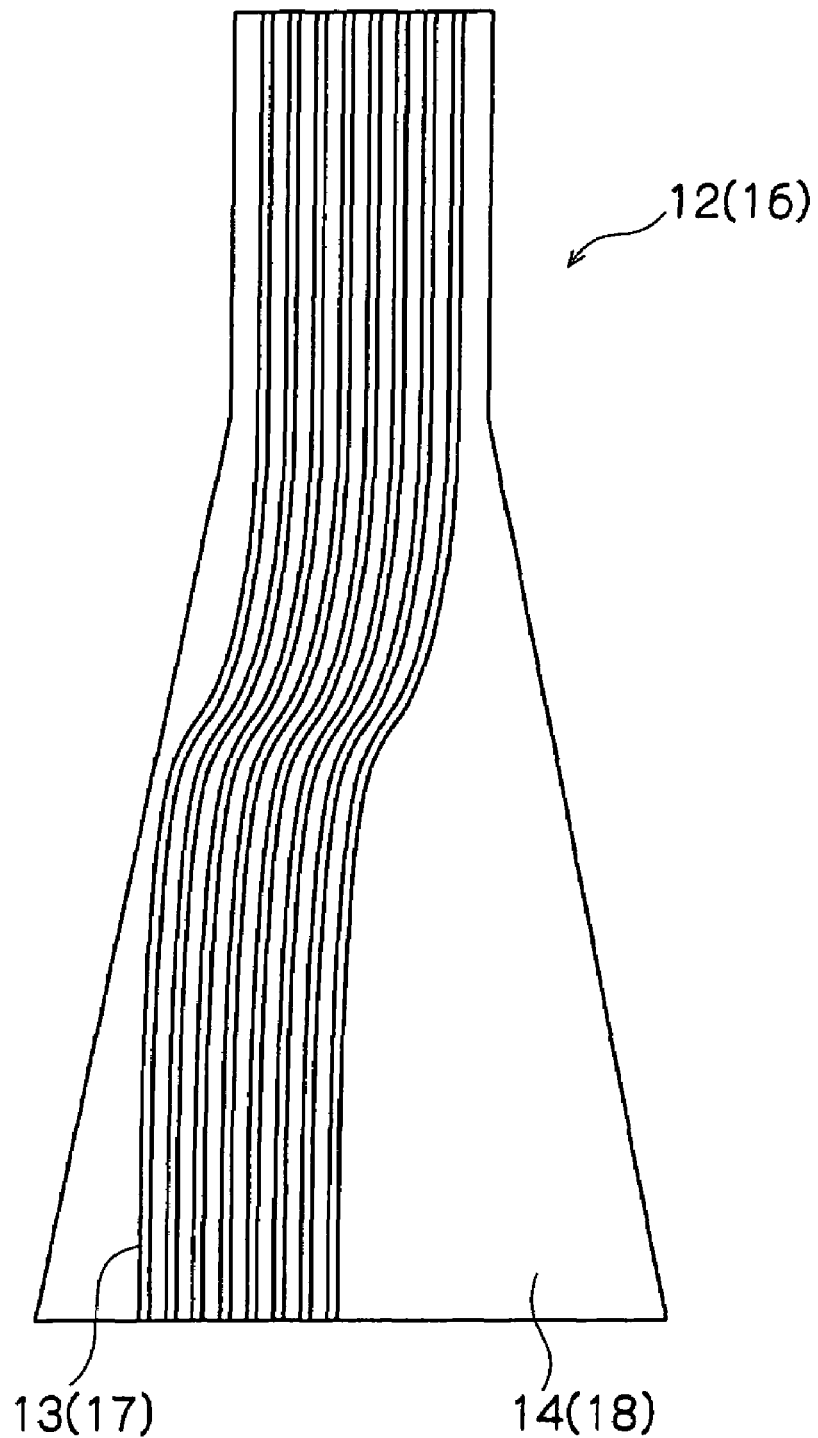
FIG. 2 is a plan view showing one example of a ridge waveguide.

In the ridge waveguides 12,16, as shown in FIG. 1A and FIG. 2, when two ridges waveguides are laminated so that cores face to each other, the cores are laminated in a lamination direction at one end part thereof (end part on a lamination side), and cores are arranged so that the cores are not overlapped at the other end part (end part on a parallel side).

In the aforementioned method, a spacer is disposed, if necessary, at the lamination part of the ridge waveguide. In addition, when the clad curable resin is filled into the gap, it is preferable that filling is performed under a reduced pressure atmosphere (this is also true when a laminated optical waveguide film using an embedded waveguide, to be described later, is produced).

The vertical plane is formed for connecting to an optical element such as an optical fiber, and an optical path conversion mirror is formed, particularly for packaging on a plane-type optical element (light emitting element, light receiving element). Working of the vertical plane and optical path conversion mirror can be easily performed with a dicing saw. The vertical plane may be diced with a dicing saw equipped with a planar blade, and the optical path conversion mirror, for example, a 45° mirror plane, may be diced using a dicing saw equipped with a Si blade with an angle of 45°. Dicing saw techniques are disclosed, for example, in JP-A No. 10-300961, the disclosure of which is incorporated by reference herein.

Next, an example using an embedded waveguide will be explained.

FIGS. 3A to 3C are views showing one example of a laminated optical waveguide film using an embedded waveguide. FIG. 3A shows a plan view, FIG. 3B shows an IIIB-IIIB cross-sectional view at a lamination part, and FIG. 3C is a cross-sectional view showing an IIIC-IIIC end surface in FIG. 3A.

In FIG. 3A, numeral 10 represents a laminated optical waveguide film, 51 represents a lower embedded waveguide, 53 represents cores thereof, 54 represents a clad film, 55 represents an upper embedded waveguide, 57 represents cores thereof, and 56 represents a clad film. A IIIC-IIIC end surface of FIG. 3A is a vertical plane at which core end surfaces are laminated in a thickness direction. In addition, a B-B end surface is an optical path conversion mirror at which core end surfaces is arranged in a monolayer, and although not shown, an optical path conversion mirror such as a 45° mirror plane is formed. In this example, at the IIIC-IIIC end surface, eight cores are laminated in two layers, and at the B-B end surface, sixteen cores are arranged in one row.

In FIG. 3B, parts represented by the same symbols as those in FIG. 3A mean the same parts. 52 and 58 represent clad films constituting lower and upper embedded waveguides, respectively, and 30 represents an adhesive layer.

The lower embedded waveguide 51 is positioned at a lower part of the lamination part, and the upper embedded waveguide 55 is positioned at an upper part of the lamination part. At least a part at which the upper and lower embedded waveguides are overlapped is adhered with an adhesive. The core 53 is led from a lower layer of the lamination part to a left side of the B-B end surface of FIG. 3A, and the core 57 is led from an upper layer of the lamination part to a right side of the B-B end surface of FIG. 3A.

The laminated optical waveguide film 10 shown in FIGS. 3A to 3C can be produced by preparing plural embedded waveguides (as shown in FIG. 3A), arranging the plural embedded waveguides by controlling a gap on a lamination side thereof (on a parallel side, it is not particularly necessary to control a gap), filling a clad curable resin having a refractive index identical or approximately equivalent to that of the clad film into the gap on the lamination side, curing the filled clad curable resin to make a laminate waveguide, thereafter, forming an end part on which waveguide cores of the laminate waveguide are laminated and to a vertical plane, and forming an optical path conversion mirror at an end part at which the waveguide cores are arranged in a monolayer. It is also possible to produce two embedded waveguides shown in FIGS. 3A to 3C using the same mold. In addition, the vertical plane and the optical path conversion mirror may be formed on an embedded waveguide in advance in a step of preparing the embedded waveguide.

Since the laminated optical waveguide film of this embodiment uses an embedded waveguide as shown in FIG. 3B, it is not necessarily required to use a spacer.

The optical path conversion mirror of the laminated optical waveguide film is formed on one straight line with a dicing saw. For this reason, a position of an optical path conversion mirror side end part of each layer is different due to a difference between upper and lower positions of the plural layers in a core lamination direction. As a result, positional variation between a projection plane of the optical path conversion mirror seen from a normal line direction of the optical waveguide film and light receiving and light emitting elements arises. It is necessary to suppress the positional variation to at least within 20%, desirably within 10%, and further desirably within 5% of an effective light receiving size. In this manner, by suppressing a size tolerance, it becomes possible to exert performance of a light receiving element. In order to make the aforementioned positional variation small, it is effective to control a thickness direction position of the waveguide cores precisely.

By adopting such a structure, at all cores, it becomes possible to arrange light emitting elements and light receiving elements forming a one-row array beneath an optical path conversion mirror of an end surface. Since a distance between an optical path conversion mirror and light receiving and emitting elements can be suppressed to a level of a thickness of a clad film constituting a waveguide, coupling to light receiving and emitting elements without a microlens can be realized.

It is desirable to make plural alignment marks on the ridge waveguide and the embedded waveguide (the alignment mark can be made in a similar manner as in core producing to be described later. That is, a convex part for making an alignment mark may be formed on a master disc in a similar way as for a core, and when arranged at a place favorable for alignment, positional variation between an alignment mark and a core can be minimized. A method of forming an alignment mark is described in detail in JP-A No. 2004-069742), and to determine a surface direction positions upon lamination of a plurality of waveguide films using the alignment marks.

In addition, upon adjusting the alignment, adjustment of alignment can be performed at a low cost not only by adjusting alignment while an alignment mark is observed with a microscope as described above, but also by preparing a linear shaped convex part on the waveguide separately from a core, providing a straight concave part corresponding to the convex part on a part of an opposing waveguide, and adhering opposing waveguides so that the aforementioned two concave and convex parts are fitted together, thereby, performing an adjustment of the alignment. In this case, it is also possible to set a height of the concave and convex parts separately from a waveguide, facilitating a fitting step.

Next, an optical waveguide module using the aforementioned laminated optical waveguide film will be explained.

Figure 4A:
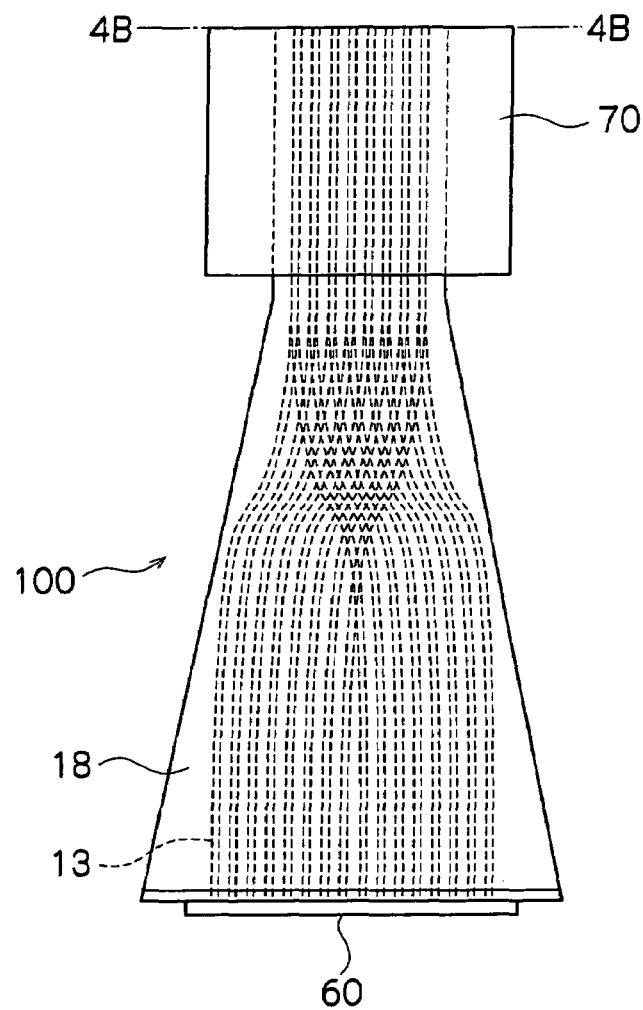
FIG. 4A is a plan view showing one example of an optical waveguide module using the laminated optical waveguide film of FIG. 1.
Figure 4B:
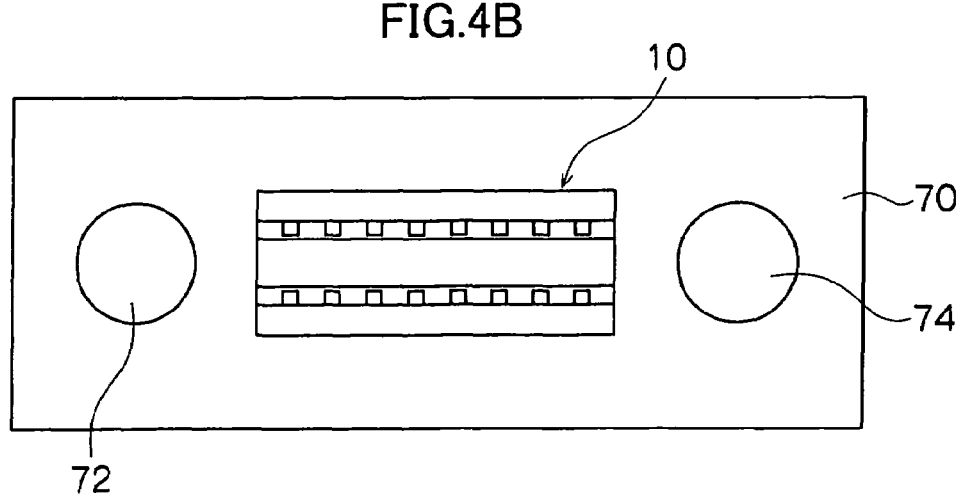
FIG. 4B is a view showing an IVB-IVB end surface.

A optical waveguide module in which a laminated optical waveguide film made by using the ridge waveguide shown in FIG. 1A to FIG. 1C is packaged together with an optical element will be explained with respect to FIG. 4A to FIG. 4B. The optical waveguide module shown in FIG. 4A is configured such that a connector is provided at a core-laminated part of a laminated optical waveguide film, and a light emitting element is coupled to an optical path conversion mirror at which cores are arranged in a monolayer. FIG. 4A is a plan view of an optical waveguide module 100, and FIG. 4B is a magnified view of an IVB-IVB end surface in FIG. 4A. In FIG. 4A, 13 represents a core in a lower ridge waveguide 12 in FIG. 1B, 18 represents a clad film, 60 represents a light emitting element (e.g., 1×16 VCSEL), and 70 represents a connector (e.g., a connector compatible with a commercially available MT connector), respectively. In FIG. 4B, 10 represents a laminated optical waveguide film, and 72 and 74 are holes for positioning with a connector provided on another optical element (e.g., an optical fiber).

In addition, a optical waveguide module in which a laminated optical waveguide film made by using the embedded waveguide shown in FIG. 3A to FIG. 3C is packaged together with an optical element will be explained in FIG. 5A to FIG. 5B. This optical waveguide module is configured such that a connector is provided at a core-laminated part of a laminated optical waveguide film, a light emitting element is connected to an optical path conversion mirror of a non-lamination side end part in a lower embedded waveguide, and a light receiving element is connected to an optical path conversion mirror of a non-lamination side end part in an upper embedded waveguide.

Figure 5A:
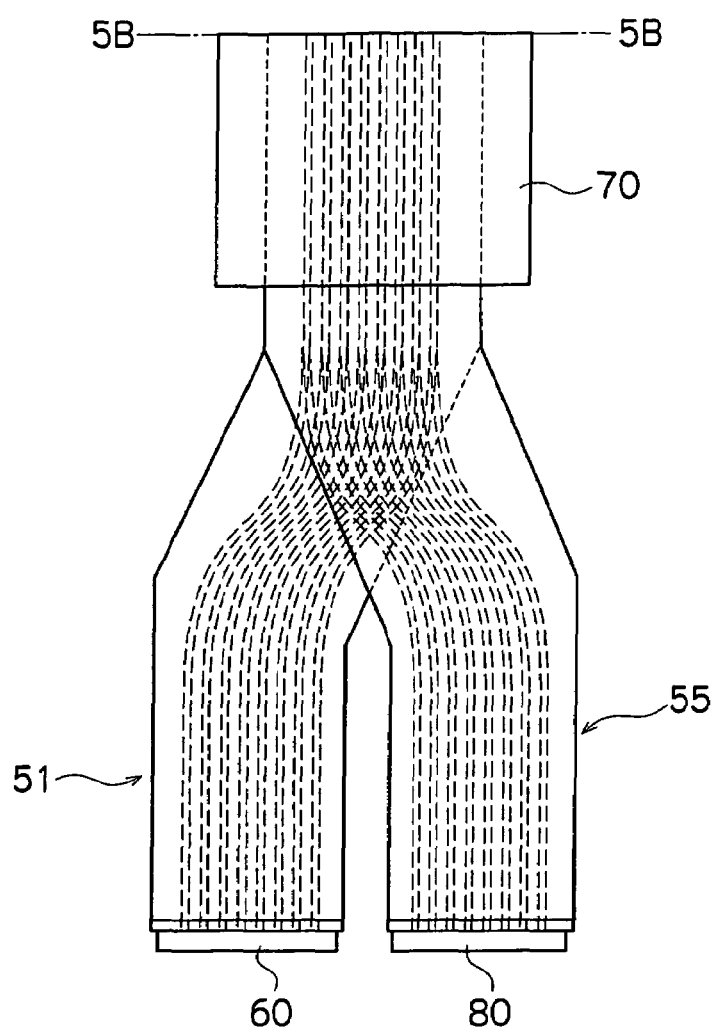
FIG. 5A is a plan view showing one example of an optical waveguide module using the laminated optical waveguide film of FIG. 3.
Figure 5B:
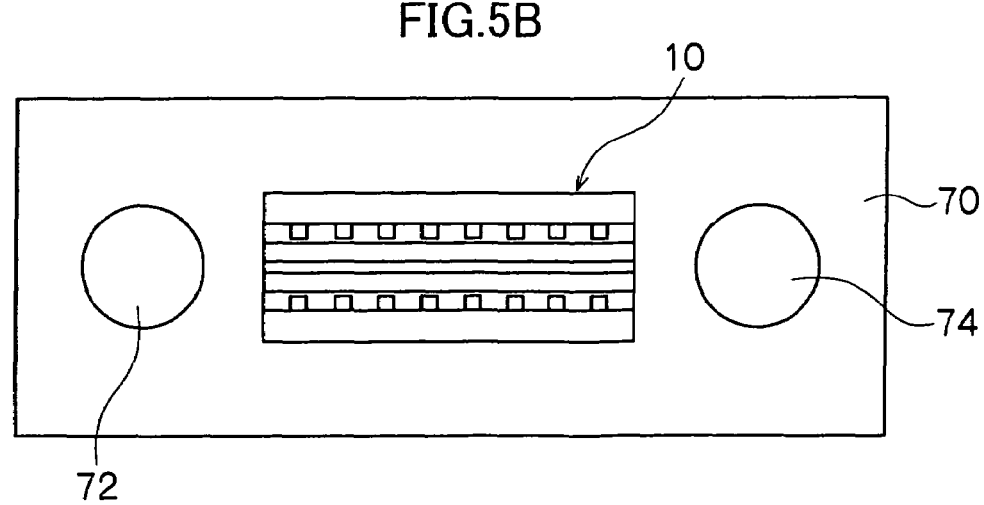
FIG. 5B is a view showing a VB-VB end surface of FIG. 5A.

FIG. 5A is a plan view, and FIG. 5B is a magnified view showing a VB-VB end surface. Parts represented by the same symbols as those in FIG. 3 represent the same parts in FIG. 5A to FIG. 5B. 70 represents a connector, 60 represents a light emitting element, and 80 represents a light receiving element, respectively. 72 and 74 are holes for positioning with a connector provided on another element (e.g., an optical fiber).

(Light Emitting Element and Light Receiving Element)

As a light emitting element, a planar-type light emitting element is preferably used in that it can be adhesively connected with an end part of a laminate-type optical waveguide. Examples of the planar-type light emitting element include a VCSEL and an LED. In addition, as a light receiving element, a planar-type light receiving element is preferably used in that it can be adhesively connected with a lower clad film of a laminated optical waveguide film. Examples of the planar-type light receiving element include a PIN photodiode (PD) and an avalanche photodiode (APD).

Next, a ridge waveguide and an embedded waveguide will be explained. In the following explanation, a "lower clad film" and an "upper clad film" correspond to the aforementioned "clad film". For convenience of explanation, a clad on which a core is provided is referred to as a "lower clad", and a clad which is formed on a core is referred to as an "upper clad". Since the ridge waveguide corresponds to a waveguide in which a core has been provided on a lower clad film in a step of making the embedded waveguide, only the embedded waveguide will be explained below.

For manufacturing a waveguide of an embodiment shown in FIG. 3A, the following method is preferably used.

1) preparing a mold which is formed of a curing layer of a curable resin for forming a mold, and in which a concave part corresponding to an optical waveguide core convex part, and two or more through-holes which communicate with one end and another end of the concave part are provided, 2) closely contacting a lower clad film having good adhesion with the mold, to the mold, 3) filling a curable resin for forming a core into a through-hole at one end of the concave part of the mold with the lower clad film adhered thereto, and suctioning under reduced pressure a through-hole at the other end of the concave part of the mold to fill the curable resin for forming a core into the concave part of the mold, 4) curing the filled curable resin for forming a core, and peeling the mold from the lower clad film, 5) laminating an upper clad film on the lower clad film on which a core has been formed.

Figure 6A:
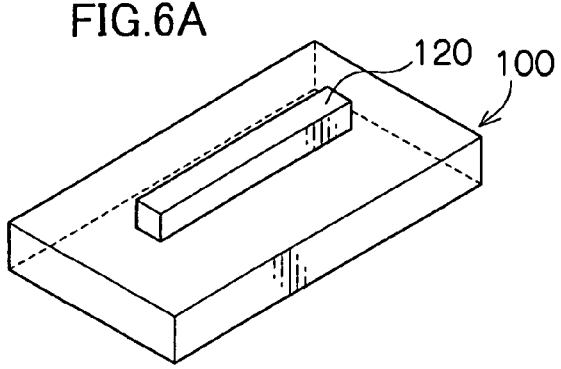
FIGS. 6(A) to 6(G) are schematic views showing a process for producing an embedded waveguide.
Figure 6B:
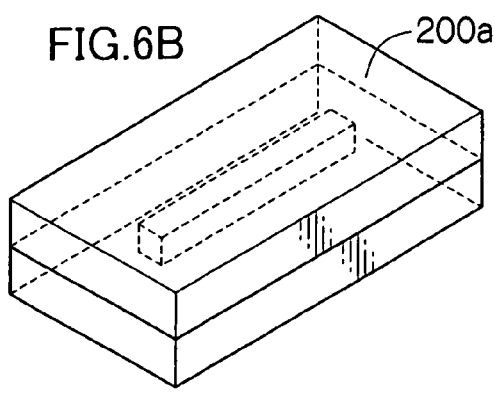
Figure 6C:
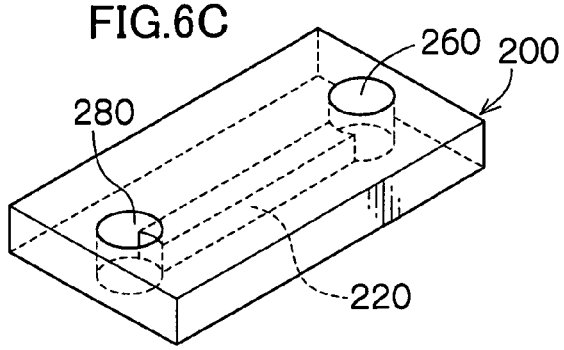

Steps 1) to 5) of the method of manufacturing a waveguide will be explained with respect to FIG. 6A to FIG. 6G. For simplification of explanation, a waveguide in which one core is provided will be explained. FIG. 6A shows a master disc 100, and 120 is a convex part corresponding to a core. A curable resin for forming a mold is coated or cast on a convex part forming surface of this master disc 100, and is cured (see FIG. 6B). In FIG. 6B, 200a is a cured resin layer. Thereafter, when the cured resin layer 200a is peeled, the cured resin layer 200a in which a concave part is formed is obtained (not shown). Through-holes 260 and 280 communicating with a concave part 220 are formed in the cured resin layer 200a in which the concave part 220 is formed, at both ends of the concave part, by punching, to obtain a mold 200 (see FIG. 6C).

Figure 6D:
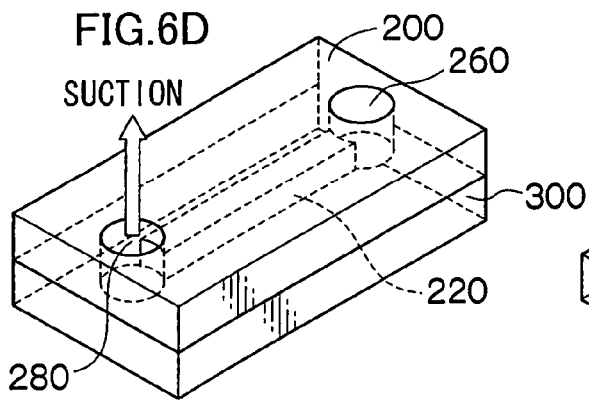
Figure 6E:
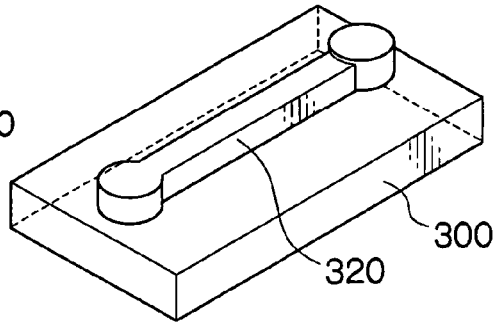
Figure 6F:
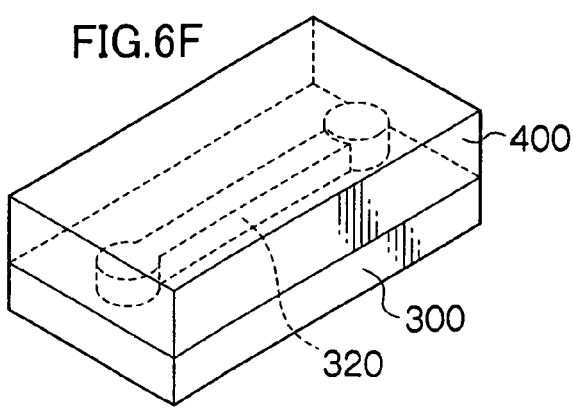

Then, as shown in FIG. 6D, a lower clad film 300 is adhered to the mold. Thereafter, a curable resin for forming a core is introduced into the through-hole 260 formed on the mold, suction under reduced pressure is performed from the through-hole 280 of the other end to fill the curable resin for forming a core into the mold concave part 220. Thereafter, when the resin is cured, and the mold is peeled, an optical core 320 is formed on the lower clad film 300 as shown in FIG. 6E.

Figure 6G:
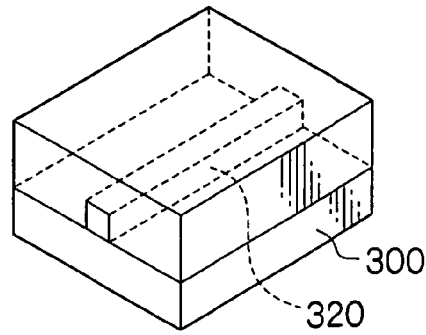

Thereafter, an upper clad film 400 is formed (see FIG. 6F), and finally, resin parts cured in the through-holes 260 and 280 are cut with a dicer to obtain a waveguide (see FIG. 6G).

Next, each step will be explained.

1) preparing a mold which is formed of a cured layer of a curable resin for forming a mold, and in which a concave part corresponding to an optical core convex part, and two or more through-holes communicating with one end and the other end of the concave part are provided.

Manufacturing of a mold is preferably performed by using a master disc on which a convex part corresponding to an optical core is formed, but is not limited thereto. A method in which a master disc in used will be explained below.

<Manufacturing of Master Disc>

For manufacturing a master disc on which a convex part corresponding to an optical core is formed, the conventional method, for example, a photolithographic method, can be used without any limitation. Alternatively, a method of manufacturing a polymer optical waveguide by an electrodeposition method or an optical electrodeposition method, for which an application was previously filed by the present applicant (Japanese Patent Application No. 2002-10240) can be also applied to manufacturing a master disc. A size of a convex part corresponding to an optical waveguide formed on the master disc can be appropriately determined depending on the use of the polymer optical waveguide. For example, in the case of an optical waveguide for a single mode, a core of around 10 μm square is generally used, and in the case of an optical waveguide for a multiple mode, a core of around 50 to 100 μm square is generally used. However, an optical waveguide having an even larger core part of around a few hundred μm is utilized depending on the use.

<Production of Mold>

One example of a method of producing a mold is a method in which a layer of a mold-forming curable resin is applied to, or cast onto the convex portion-formed surface of the master plate produced in the above manner, thus form a layer of the mold-forming curable resin. The layer is then subjected to drying treatment as required, followed by curing treatment. Thereafter, the cured resin layer is peeled from the master plate to make a mold having a concave portion corresponding to the convex portion, and through-holes are formed in the mold in the vicinity of one end and the other end of the concave portion. The through-holes may be formed by punching the mold with a predetermined shape. Even in the case of the through-holes being punched, the close contact property between the mold and the clad film substrate is so high that no gap, other than the concave portion of the mold, is formed between the mold and the lower clad film base material, with the result that there is no fear that the core-forming curable resin never penetrates anywhere other than the concave portion.

The thickness of the mold (resin cured layer) is preferably about 0.1 to 50 mm, but this can be decided as appropriate, taking into due consideration of handling characteristics required for the mold.

It is also desirable that, in order to promote peeling (removing) from the mold, the master plate be subjected in advance to releasing treatment such as the application of a releasing agent.

The through-hole disposed on the side from which the core-forming curable resin is introduced may have a function as a liquid (core-forming curable resin) trap. Further, the through-hole disposed on the side from which the core-forming curable resin is discharged is used for vacuum suction for the purpose of reducing pressure in the concave portion of the mold. No particular limitation is imposed on the shape and size of the through-hole on the introduction side, as long as the through-hole is linked with the introduction end of the concave portion. Moreover, no particular limitation is imposed on the shape or the size of the through-hole on the discharge side, as long as the through-hole is linked with the discharge end of the concave portion and can be used for the purpose of vacuum suction.

Since the through-holes disposed on the side from which the core-forming curable resin is introduced perform a function as a liquid trap, if, when the mold is brought into close contact with the lower clad film, the sectional area of the trap is large at the side in contact with the base material, and is made so as to decrease commensurate with its distance from the base material, after the core-forming curable resin has been introduced into the concave portion and cured, the base material is easily peeled from the mold. Since it is unnecessary for the through-holes on the core-forming curable resin discharge side to perform a function as a liquid trap, it is unnecessary to adopt the same kind of sectional structure.

Other examples of production of the mold include a method in which not only the convex portion corresponding to the core of the optical waveguide but also the convex portion for forming the through-holes (the height of this convex portion is made to be greater than the thickness of the cured layer of the mold-forming curable resin) is formed in the master plate. The mold-forming curable resin is then, for example, applied to the master plate such that the convex portion for forming the though-holes penetrates through the resin layer. The cured resin layer is then cured and thereafter peeled (removed) from the master plate.

The mold-forming curable resin used to manufacture the mold preferably makes it possible to obtain a cured product which can be easily peeled from the master plate, as a (repeatedly used) mold maintains a mechanical strength/dimensional stability greater than a predetermined level, retains a hardness sufficient to maintain a concave shape and exhibits a high level adhesion to the lower clad film. It is possible to add various additives to the mold-forming curable resin.

The mold-forming curable resin can be applied to or cast onto the surface of the master plate. Because it is necessary to copy exactly the convex portions corresponding to the individual optical cores formed on the master plate, the mold-forming curable resin preferably has a viscosity lower than a certain limit, for example, about 500 to 7000 mPa·s. (It should be noted that a "mold-forming curable resin" includes resins made into elastic rubber-like bodies after curing.) Moreover, a solvent for regulating a level of viscosity may be added, to an extent that the solvent does not exert an adverse influence.

As the mold-forming curable resin, from the viewpoint of elasticity, mechanical strength/dimensional stability, hardness and adhesion to the clad film, as mentioned above, a curable organopolysiloxane which is made into silicone rubber (silicone elastomer) or a silicone resin is preferably used. The curable organopolysiloxane is preferably one containing a methylsiloxane group, an ethylsiloxane group or a phenylsiloxane group in its molecules. The curable organopolysiloxane may also be either a one-liquid type, or a two-liquid type used in combination with a curing agent. The curable organopolysiloxane may be a thermosetting type or an ambient-temperature-curable type (e.g., of a type which is cured by moisture in the air), or it may be a curable organopolysiloxane which takes advantage of other curing phenomena (e.g., of an ultraviolet ray-curable type).

The curable organopolysiloxane is preferably one which is made into silicone rubbers after curing. Among these siloxanes, those generically called liquid silicone rubbers can be used (in this context "liquid" includes materials having a high viscosity such as paste-like materials). Two-liquid types used in combination with a curing agent are preferable. Among such types, addition-type liquid silicon rubbers are preferable because they are cured in such a way that the surface and insides thereof are uniformly cured within a short period of time, produce no, or a in the process few byproducts; and they also have a high degree of releasability and a modest shrinkage factor.

Among the liquid silicone rubbers mentioned above, liquid dimethylsiloxane rubbers are particularly preferable in terms of adhesion, releasability, strength and hardness. Further, the cured product of the liquid dimethylsiloxane rubber usually has a refractive index as low as about 1.43 and a mold made from the cured product can therefore preferably be utilized as the upper clad film as it stands without releasing it from the clad film. In these circumstances, steps are needed to be taken to prevent the introduced core-forming resin from being peeled from the clad film.

The viscosity of the liquid silicone rubber is preferably about 500 to 7000 mPa·s and more preferably about 2000 to 5000 mPa·s from the viewpoint of copying the convex portion corresponding to the core of the optical waveguide exactly, reducing the mingling of air cells to make it easy to defoam and from the viewpoint of forming a mold having a thickness of several mm.

The surface energy of the mold is preferably in a range of 10 dyne/cm to 30 dyne/cm, and more preferably 15 dyne/cm to 24 dyne/cm from the viewpoint of adhesion to the base material film.

In terms of moldability, maintaining the shape of the concave portion and releasability the share rubber hardness of the mold is preferably 15 to 80 and more preferably 20 to 60.

The surface roughness (root-mean-square roughness) (RMS) of the mold is 0.2 μm or less and preferably 0.1 μm (100 nm) or less in view of moldability.

Moreover, the mold preferably transmits light in the ultraviolet region and/or in the visible region. The reasons why the mold preferably transmits light in the visible region is that when the mold is brought into contact with the lower clad film in the following step (2), both can be aligned, and it can be observed whether for example in step (3) the core-forming curable resin is being introduced into the concave portion of the mold and thus can confirm, easily whether the process of introducing the resin has been completed. Moreover, the reason why the mold preferably transmits light in the ultraviolet region is that when an ultraviolet ray-curable resin is used as the core-forming curable resin, ultraviolet curing is carried out through the mold and the transmittance of the mold in the ultraviolet region (250 nm to 400 nm) is 80% or more.

The above-described curable organopolysiloxane and particularly, the liquid silicone rubber which becomes silicone rubber after curing is superior in terms of what are contradictory characteristics, namely close contact property to the lower clad film and releasability from the lower clad film. The curable organopolysiloxane, and in particular the liquid silicone rubber, also has the ability to copy a nanostructure and can prevent even the penetration of a liquid when the silicone rubber is brought into close contact with the lower clad film. The mold using such silicone rubber copies the master plate with a high degree of accuracy and because it is in close contact with the lower clad film, it becomes possible to introduce the core-forming resin efficiently into only the concave portion between the mold and the lower clad film. Moreover, it is also easy to peel the lower clad film from the mold. In consequence, it is possible to manufacture extremely easily from the mold a polymer optical waveguide which keeps its shape to a high level of accuracy.

(2) Step for bringing a lower clad film having a good contact property with a mold into close-contact with the mold:

Since an optical element prepared from a polymer optical waveguide according to the present invention is used for various hierarchies in an optical wiring, materials used for a lower clad film may be selected on the basis of the use to which the polymer optical waveguide is applied, taking into consideration optical characteristics such as refractive index and light-transmittance, and other factors such as mechanical strength, heat resistance, close-contact property to the mold and flexibility. Since the clad film constitutes the clad portion, a high light-transmittance is inevitably required. Examples of materials used as the film include an alicyclic acrylic resin film, an alicyclic olefin resin film, a cellulose triacetate film and a fluorine-containing film. In order to secure a difference in the refractive indices of the core and the film base material, the refractive index of the film base material is preferably 1.55 or less, and more preferably 1.53 or less.

As the alicyclic acrylic resin film, OZ-1000, or OZ-1100 (manufactured by Hitachi Chemical Co., Ltd.) in which aliphatic cyclic hydrocarbon such as tricyclodecane is introduced into an ester substituent is used.

Examples of the alicyclic olefin resin film include a film in which a main chain has a norbornene structure, and a film in which a main chain has a norbornene structure, and a side chain has a polar group such as an alkyloxycarbonyl group (an alkyl group having a carbon number of 1 to 6, cycloalkyl group). Among these, an alicyclic olefin resin in which a main chain has a norbornene structure and a side chain has a polar group such as an alkyloxycarbonyl group as described above has excellent optical properties such as low refractive index (a refractive index is around 1.50, and a difference between a refractive index of a core and that of a clad can be maintained) and high light transmittance, is excellent in close contact property with a mold and, further, excellent in heat resistance. For this reason, this is particularly suitable for producing the optical waveguide film of the invention.

In addition, it is desirable that a thickness of the lower clad film is at least 20 μm in order to facilitate handling upon lamination, and maintain a mechanical strength to be imparted to a waveguide. When a thickness of the film is less than 20 μm, a bending force is exerted on a core part at manufacturing, a strain is easily generated in a core part, and a yield is deteriorated or a performance is remarkably reduced. Since the cost of a curable resin (ultraviolet-ray curable resin or thermosetting resin) used as an upper clad film or an adhesive is high, in order to reduce a use amount thereof to realize a lower cost, it is desirable that the lower clad film is made to be thick as far as permitted by a designed pitch in the waveguide.

In addition, when a lower clad film is arranged on a side near an optical element such as a light emitting element or a light receiving element in a optical waveguide module, a thickness of the lower clad film becomes an optical path length between an optical path conversion mirror of a waveguide and a light emitting point or a light receiving point. Therefore, in order to enhance a connecting efficacy, it is desirable that a thickness of the lower clad film is smaller. Taking this into consideration, in this case, an upper limit of the thickness of the lower clad film is 200 μm or less, desirably 100 μm or less, and further desirably 70 μm or less (when an upper clad film in the following step 5) is on the side near the light receiving or emitting element, a thickness of the upper clad film is set in the above-described manner).

(3) Introducing a core-forming curable resin into a first through-hole of the mold with which the lower film base material is brought into close contact, while sucking the concave portion of the mold from a second through-hole under reduced pressure to introduce the core-forming curable resin into the concave portion of the mold In this step, the mold is brought into close contact with the lower film base material, core-forming curable resin is introduced in the through-hole positioned at the resin introduction side, resin is also sucked under reduced pressure from the through-hole disposed on the resin discharge side to introduce the resin into a gap (the concave portion of the mold) formed between the mold and the lower film base material. The sucking under reduced pressure can enhance adhesion between the mold and the lower film base material, whereby air cells can be prevented from becoming mingled. The sucking under reduced pressure is carried out, for example, by inserting a sucking tube into the though-hole disposed on the discharge side, and thus connecting the sucking tube with a pump.

As the core-forming curable resin, resins such as radiation-curable, electron ray-curable or thermosetting resins may be used. Among these resins, ultraviolet ray-curable resins and thermosetting resins are preferably used.

As the ultraviolet ray-curable resin or thermosetting resin for forming the above core, ultraviolet ray-curable or thermosetting monomers, oligomers or mixtures of monomers and oligomers are preferably used.

Also, as the ultraviolet ray-curable resin, an epoxy type, a polyimide type or an acrylic type ultraviolet ray-curable resin is preferably used.

The core-forming curable resin is introduced into the gap (the concave portion of the mold) formed by a capillary phenomenon between the mold and the lower film base material. The core-forming curable resin therefore preferably has a viscosity low enough to ensure that the core-forming curable resin can be introduced. The viscosity of the curable resin is therefore preferably 10 mPa·s to 2,000 mPa·s, more preferably 20 mPa·s to 1,000 mPa·s, and still more preferably 30 mPa·s to 500 mPa·s.

In addition, a change in the volume of the curable resin before and after the resin is cured must be small enough to reproduce to a high degree of accuracy the original shape of the concave portion corresponding to the core of the optical waveguide formed on the master plate. For example, a reduction in the volume can become a cause of a propagation loss. Therefore, the core-forming curable resin is preferably one reduced in volumetric change to the maximum extent possible. Resins having a volumetric change of 10% or less and preferably 6% or less are desirable. Whenever possible, it is preferable to avoid using a solvent to make the resin less viscous, because this brings about a significant change in volume before and after the resin is cured.

In order to minimize a change in volume (shrinkage) of the core-forming curable resin when the resin is cured, a polymer may be added to the resin. Preferable as such a polymer are those which are compatible with the resin and which do not adversely affect the refractive index, elastic modulus and transmitting characteristics of the resin. Further, the addition of the polymer not only minimizes volumetric change but also controls to a high degree of accuracy the viscosity and the grass transition temperature of the cured resin. As the polymer, an acrylic type, a methacrylic type and an epoxy type can be used, but the invention is not limited to these types.

The refractive index of the cured product of the core-forming curable resin must be higher than that of the clad (e.g., the lower clad layer and the cured product of the clad-forming curable resin in the above step (6)) and is 1.50 or more and preferably 1.53 or more. A difference in refractive index between the clad (including the clad layer in the following step (5)) and the core is 0.01 or more.

(3) Introducing a core-forming curable resin into a first through-hole of the mold with which the lower film base material is brought into close contact, while sucking the concave portion of the mold from a second through-hole under reduced pressure to introduce the core-forming curable resin into the concave portion of the mold In this step, the mold is brought into close contact with the lower film base material, core-forming curable resin is introduced in the through-hole positioned at the resin introduction side, resin is also sucked under reduced pressure from the through-hole disposed on the resin discharge side to introduce the resin into a gap (the concave portion of the mold) formed between the mold and the lower film base material. The sucking under reduced pressure can enhance adhesion between the mold and the lower film base material, whereby air cells can be prevented from becoming mingled. The sucking under reduced pressure is carried out, for example, by inserting a sucking tube into the though-hole disposed on the discharge side, and thus connecting the sucking tube with a pump.

As the core-forming curable resin, resins such as radiation-curable, electron ray-curable or thermosetting resins may be used. Among these resins, ultraviolet ray-curable resins and thermosetting resins are preferably used.

As the ultraviolet ray-curable resin or thermosetting resin for forming the above core, ultraviolet ray-curable or thermosetting monomers, oligomers or mixtures of monomers and oligomers are preferably used.

Also, as the ultraviolet ray-curable resin, an epoxy type, a polyimide type or an acrylic type ultraviolet ray-curable resin is preferably used.

The core-forming curable resin is introduced into the gap (the concave portion of the mold) formed by a capillary phenomenon between the mold and the lower film base material. The core-forming curable resin therefore preferably has a viscosity low enough to ensure that the core-forming curable resin can be introduced. The viscosity of the curable resin is therefore preferably 10 mPa·s to 2,000 mPa·s, more preferably 20 mPa·s to 1,000 mPa·s, and still more preferably 30 mPa·s to 500 mPa·s.

In addition, a change in the volume of the curable resin before and after the resin is cured must be small enough to reproduce to a high degree of accuracy the original shape of the concave portion corresponding to the core of the optical waveguide formed on the master plate. For example, a reduction in the volume can become a cause of a propagation loss. Therefore, the core-forming curable resin is preferably one reduced in volumetric change to the maximum extent possible. Resins having a volumetric change of 10% or less and preferably 6% or less are desirable. Whenever possible, it is preferable to avoid using a solvent to make the resin less viscous, because this brings about a significant change in volume before and after the resin is cured.

In order to minimize a change in volume (shrinkage) of the core-forming curable resin when the resin is cured, a polymer may be added to the resin. Preferable as such a polymer are those which are compatible with the resin and which do not adversely affect the refractive index, elastic modulus and transmitting characteristics of the resin. Further, the addition of the polymer not only minimizes volumetric change but also controls to a high degree of accuracy the viscosity and the grass transition temperature of the cured resin. As the polymer, an acrylic type, a methacrylic type and an epoxy type can be used, but the invention is not limited to these types.

The refractive index of the cured product of the core-forming curable resin must be higher than that of the clad (e.g., the lower clad layer and the cured product of the clad-forming curable resin in the above step (6)) and is 1.50 or more and preferably 1.53 or more. A difference in refractive index between the clad (including the clad layer in the following step (5)) and the core is 0.01 or more.

4) A Step of Curing the Filled Curable Resin for Forming a Core, and Peeling a Mold from a Lower Clad Film.

In this step, the filled curable resin for forming a core is cured. For curing an ultraviolet-ray curable resin, an ultraviolet-ray lamp, an ultraviolet-ray LED, or a UV irradiating device is used. For curing a thermosetting resin, heating in an oven is used.

The mold used in the aforementioned steps 1) to 3) can be used, as is, as an upper clad film if conditions such as a refractive index are satisfied. In this case, it is not necessary to peel a mold, and the mold can be utilized, as is, as the upper clad film. In this case, in order to enhance contact property between the mold and a core material, it is preferable to ozone-treat the mold.

5) A Step of Forming an Upper Clad Film on a Lower Clad Film in which a Core has been Formed.

An upper clad film is formed on a lower clad film on which a core is formed, and examples of the upper clad film include a film (for example, a lower clad film such as that used in the aforementioned step 2) can be similarly used), a layer obtained by coating and curing a curable resin for a clad, and a polymer membrane obtained by coating and drying a solution of a polymer material in a solvent. As the curable resin for a clad, an ultraviolet-ray curable resin and a thermosetting resin are preferably used and, for example, an ultraviolet-ray curing or thermosetting monomer, oligomer or a mixture of the monomer and the oligomer is used. As the ultraviolet-ray curable resin, there are various resins such as acryl-based and epoxy-based resins. A solvent-free curable resin having a volume shrinkage percentage of around 4 to 5% is commercially sold and is available. By using the ultraviolet-ray curable resin, good light transmittance can be maintained. A thermosetting resin has a smaller volume shrinkage percentage as compared with that of an ultraviolet-ray curable resin, but generally, but in contrast, light transmittance thereof is slightly reduced.

In order to reduce a volume change (shrinkage) of a curable resin for a clad after curing, a polymer having compatibility with the resin and having no adverse influence on a refractive index, an elastic modulus and transmission properties of the resin (e.g., a methacrylic acid-based or epoxy-based polymer) may be added to the resin.

When a film is used as the upper clad film, it is applied using an adhesive, and thereupon, it is desirable that a refractive index of the adhesive is near a refractive index of the film. As the adhesive to be used, an ultraviolet-ray curable resin or a thermosetting resin is preferably used and, for example, an ultraviolet-ray curable or thermosetting monomer, oligomer or a mixture of the monomer and the oligomer is used.

In order to reduce a volume change (shrinkage) of the ultraviolet-ray curable resin or the thermosetting resin after curing, the same polymer as the polymer to be added to the upper clad film can be added.

It is desirable that refractive indexes of the upper clad film and the curable resin for a clad are 1.55 or less, and preferably 1.53 or less, in order to maintain a difference in refractive index with respect to a core. In addition, it is preferable from a viewpoint of light containment that a refractive index of the upper clad film is the same as a refractive index of a film substrate.

EXAMPLES

The following Examples further specifically illustrate the invention, but the invention is not limited by these Examples.

Example 1

In this example, two ridge waveguides as shown in FIG. 2 are manufactured, and these are laminated to make a laminated optical waveguide film as shown in FIG. 1.

<Manufacturing of Master Disc>

A thick-film resist (SU-8 manufactured by Microchemical) is coated on a Si substrate by a spin coating method, this is pre-baked at 80° C., light is irradiated thereto through a photomask, this is developed, and convex parts for eight optical waveguides (width: 50 µm, height: 50 µm, length: 50 mm, pitch between convex parts for optical waveguide: 250 µm) having a square cross-section and having a bent in a letter S-shape in a longitudinal direction, and a convex part for an alignment mark similarly having a square cross-section and having a cross shape of a size of 300 µm are formed. Then, this is post-baked at 120° C. to make a master disc for manufacturing a waveguide core.

<Manufacturing of Mold>

Next, a releasing agent is coated on this master disc, a thermosetting dimethylsiloxane resin (SYLGARD184 manufactured by Dow Corning Asia) is poured on a convex part forming surface of the master disc, and is heated at 120° C. for 30 minutes to carry out thermal curing, and thereafter peeled to make a mold (thickness of mold: 5 mm) having concave parts corresponding to convex parts for a waveguide core and an alignment mark having a square cross-section. Further, holes having a diameter of 3 mm are respectively formed in the mold so that both ends of the convex part for a waveguide core are exposed, to make an input and output part for an ultraviolet-ray curable resin for a core described below, and holes having a diameter of 1 mm are formed at both ends of the concave part for an alignment mark, whereby the mold is completed.

<Manufacturing of Ridge Waveguide>

A film substrate (Arton film manufactured by JSR, refractive index: 1.510) having a designed thickness of 100 µm, which is a little larger than the mold, is prepared, and this Arton film and the mold are brought into close contact with each other. Then, a few droplets of an ultraviolet-ray curable resin for a core having a viscosity of 1300 mPa·s are dropped into a hole at one end of the concave part for manufacturing a core formed on the mold, and a hole at another end is suctioned with a diaphragm-type suction pump (maximum suction pressure 33.25 kPa) at a suction force of 20 kPa, whereby the ultraviolet-ray curable resin is filled into each convex part. Then, UV light of 50 mW/cm² is irradiated thereto through the mold for 5 minutes to cure the ultraviolet-ray curable resin. When the mold is peeled from the film substrate, a core having the same shape as that of the master disc convex part is formed on the film substrate.

Further, according to the same manner as that for manufacturing the waveguide core, an alignment mark is manufactured. However, an ultraviolet-ray curable resin to be used is one that turns pale pink at curing.

Then, a part of the ultraviolet-ray curable resin cured in the holes for input and output is cut off to form a rectangle, whereby a lower ridge waveguide having no protrusions other than the convex parts for the cores and the alignment mark is manufactures. A refractive index of the core and an alignment mark is 1.53.

An upper ridge waveguide is manufactured.

<Manufacturing of Laminated Optical Waveguide Film>

A quartz glass plate jig processed so that it can vacuum-suck the manufactured ridge waveguide is prepared. The quartz glass plate jig can finely adjust positions of the upper ridge waveguide and the lower ridge waveguide to be laminated, in a planar direction and a lamination direction, at a parallel side and a lamination side thereof.

Using the jig, and while the alignment mark provided on each waveguide is observed with a microscope, positions of the upper ridge waveguide and the lower ridge waveguide are adjusted so that upper and lower cores on the lamination side have a lamination direction pitch of 250 µm, all of the sixteen cores on the parallel side are arranged at a pitch of 250 µm, and variation in a thickness direction (direction orthogonal to a plane of the ridge waveguide) among positions of the cores becomes 1 µm or less.

In this state, an Arton film of a thickness of 188 µm cut into a width of 2 mm and a length of 8 mm which is to be a spacer is disposed only on a lamination side, in order that an amount of curing shrinkage generated at adhesion due to an excessively thick adhesive layer on the lamination side does not become large, and in order to reduce an amount of an adhesive to be used.

Then, an ultraviolet-ray curable resin for a clad having a refractive index of 1.51 is filled into a gap between the upper ridge waveguide and the lower ridge waveguide. Similarly as in the case where a core is filled, by making a pressure of the filling atmosphere a reduced pressure of around 20 kPa, the resin can be filled within about 5 minutes.

After filling, UV light of 50 mW/cm² is irradiated for 10 minutes through the jig while maintained at the jig, to cure the ultraviolet-ray curable resin. A flexible lamination waveguide is thus obtained. A relative positional error of the cores in the lamination waveguide is 2 µm or less both in a planar direction and a thickness direction.

A parallel side end part of the lamination waveguide is cut with a dicing saw equipped with a 45° blade to form an optical path conversion mirror (45° mirror plane). In addition, a lamination-side end part is cut with a dicing saw equipped with a planar blade. Further, side of the laminated optical waveguide film not used as an optical plane is subjected to punching processing with a cutter, to render a width of the lamination-side end part 3 mm, which is smaller than a pin interval of a MT connector.

By the aforementioned step, a laminated optical waveguide film in which a parallel side is provided with cores in a 1×16 arrangement and has a 45° mirror plane, and a lamination side is provided with cores in a 2×8 arrangement, and has a vertical end surface, is made. A full length thereof is 25 mm, and an insertion loss measured with an optical fiber between input and output sides is 2 dB or less in all sixteen cores.

Example 2

In this example, an optical waveguide module is manufactured using the laminated optical waveguide film made in Example 1.

A 45° mirror plane forming side end part of the laminated optical waveguide film is adhered to a 1×16 VCSEL array (manufactured by Fuji Xerox Co., Ltd.). Further, an MT compatible connector having a positioning pin compatible with an MT connector and in which a through-hole is provided at a central part so that the end part can be inserted into the through-hole is adhered to a lamination side end part of a laminated optical waveguide film. Upon adhesion, both of the VCSEL and the MT compatible connector are adhered so that a positional variation is within 3 µm relative to a waveguide core.

In this manner, an optical waveguide module for outputting VCSEL light to a 2×8 optical fiber array is manufactured. An insertion loss of this optical module is within 3 dB as an insertion loss on the basis of an output of VCSEL. A deviation of the insertion loss among the channels is within 0.3 dB.

Example 3

In this example, two embedded waveguides as shown in FIG. 3 are manufactured, and these are used to make a laminated optical waveguide film.

First, a master disc and a mold are manufactured in the same manner as in Example 1. Convex parts for eight optical waveguides (width: 50 µm, height: 50 µm, length: 50 mm, pitch between convex parts for optical waveguide: 250 µm) having a square cross-section and being bent in a letter S-shape in a longitudinal direction, and a convex part for an alignment mark similar to that of Example 1 are formed on the master disc.

<Manufacturing of Embedded Waveguide>

This mold and a film substrate (Arton film manufactured by JSR, refractive index of 1.510) having a thickness of 70 µm are prepared. This Arton film and the mold are adhered. Then, a few droplets of an ultraviolet-ray curable resin (PJ3001 manufactured by JSR) having a viscosity of 1300 mPa·s are dropped into a hole provided at one end of a concave part for manufacturing a waveguide core formed on the mold, and another pore at the other end of the concave part is suctioned with a diaphragm-type suction pump (maximum suction pressure 33.25 kPa) at a suction force of 20 kPa, whereby the ultraviolet-ray curable resin is filled into each concave part. Then, UV light of 50 mW/cm² is irradiated for 5 minutes through the mold to ultraviolet ray-cure the resin. When the mold is peeled from the film substrate, cores having the same shape as that of the master disc convex part is formed on the film substrate.

Further, an alignment mark is produced in the same manner as in Example 1.

Then, regarding the Arton film on which a core and an alignment mark are formed as described above, a part of the ultraviolet-ray curable resin cured in the holes for input and output is cut off to form a rectangle having no protrusions other than the convex parts for the cores and the alignment mark.

Further, an ultraviolet-ray curable resin for a clad having a refractive index of 1.51 and an Arton film having a thickness of 70 μm are covered on the Arton film on which the cores and the alignment mark have been formed and which has been into a rectangle, and UV light of 50 mW/cm² is irradiated for 10 minutes to cure the resin, to make an embedded waveguide having a sandwich structure. Thereupon, a coating thickness of an ultraviolet-ray curable resin for a clad is adjusted so that a thickness of the embedded waveguide becomes approximately 230 μm.

A refractive index of the core and the alignment mark is 1.53.

An upper embedded waveguide is manufactured in a similar manner.

<Manufacturing of Laminated Optical Waveguide Film>

Positions of two embedded waveguides on a lamination side are adjusted so that a pitch of upper and lower cores becomes 250 μm, by using the aforementioned jig and observing the alignment marks with a microscope. The ultraviolet-ray curable resin for a clad is poured as an adhesive between the two position-adjusted waveguides. At this time, a thickness of an adhesive layer is 20 μm.

Then, in the state where the two waveguide are held by the jig, UV light of 50 mW/cm² is irradiated for 10 minutes through the jig to cure the ultraviolet-ray curable resin to obtain a lamination waveguide.

Then, as in Example 1, a 45° mirror plane is formed on a parallel side end part of this lamination waveguide, a vertical plane is formed on a lamination side end part, and sides are cutter-processed. A flexible laminated optical waveguide film is thus obtained.

A relative position error of the laminated waveguide is within 2 μm both in a planar direction and a thickness direction. In the present Example, since parallel side end parts (45° mirror plane forming sides) of the two embedded waveguides are a VCSEL connecting end part and a PD connecting end part, respectively, it is not necessary to position a parallel side end part.

Via such a step, a laminated optical waveguide film in which a parallel side has two 1×8 arrays and a 45° mirror plane and a lamination side has cores in a 2×8 arrangement is made. A full length thereof is 25 mm, and an insertion loss measured with an optical fiber at input and output sides is within 1.5 dB in all of the 16 cores.

Example 4

In this Example, an optical waveguide module is made by using the laminated optical waveguide film made in Example 3.

A 1×8 VCSEL arrays is adhered on a 45° mirror plane forming side end part of the lower embedded waveguide of the laminated optical waveguide film made in Example 3, and a 1×8 PD array is adhered on a 45° mirror plane forming side end part of the upper embedded waveguide, respectively. Further, a MT compatible connector having a positioning pin compatible with a MT connector and in which a waveguide film can be inserted into a central part is adhered to a lamination side end part. These VCSEL, PD and MT compatible connector are adhered so that all of them are within a positional variation of 3 μm or less relative to the waveguide cores.

In this manner, a optical waveguide module in which VCSEL light is outputted into a 8 channel optical fiber, and 8 channel input light from an optical fiber to be measured with a PD array is manufactured. An insertion loss of this optical module is within 2.5 dB as expressed by an insertion loss using output of VCSEL as a standard. Light of an input side optical fiber is led to PD at a loss of 2.5 dB or less. The variations in the channels are 0.3 dB or less.

Since the laminated optical waveguide film of the invention is such that the waveguide cores have an end part having a laminated structure (lamination side end part) and an end part having a parallel structure (parallel side end part), although the film has a very simplified structure, the laminated type optional waveguide film can easily connected to an optical fiber side, a light emitting element, a light receiving element, in particular, a planar-type light receiving or emitting element, and a connecting efficiency is good, accordingly, packaging on a optical waveguide module is easy.

Further, since the optical waveguide module of the invention can be manufactured by simply connecting the aforementioned laminated optical waveguide film to a light emitting element, a light receiving element or a connector with an adhesive, and a microlens are not necessary, the module can be obtained at a very lower cost. In addition, since the module can be fabricated to shapes and the like corresponding to an arbitrary specification connector can be made, a optical waveguide module corresponding to an arbitrary light fiber array can be realized.

An object of the invention can be attained by the following means.

(1) A laminated optical waveguide film in which a plurality of waveguide cores are formed, and a plurality of end surfaces at which the waveguide cores are exposed are formed, wherein, among the plurality of end surfaces, a first end surface has waveguide core end surfaces laminated in a thickness direction, and a second end surface has waveguide core end surfaces arranged in parallel.

(2) The laminated optical waveguide film according to (1), wherein the second end surface is an optical path conversion mirror.

(3) The laminated optical waveguide film according to (2), wherein the first end surface is a vertical plane relative to a laminated optical waveguide film surface.

(4) A optical waveguide module, wherein a plurality of waveguide cores are formed, a plurality of end surfaces at which the waveguide cores are exposed are formed, among the plurality of end surfaces, a first end surface has waveguide core end surfaces laminated in a thickness direction and a second end surface has waveguide core end surfaces arranged in parallel, and at least one of a planar light emitting element and a planar light receiving element is connected to the second end surface.

(5) The optical waveguide module according to (4), wherein the second end surface is an optical path conversion mirror.

(6) The optical waveguide module according to (5), wherein at least one of the planar light emitting element and the planar light receiving element is directly adhered to the end surface not via a lens.

(7) The optical waveguide module according to (6), wherein the planar light emitting element is a vertical cavity surface emission laser.

(8) The optical waveguide module according to (5), wherein the first end surface is a vertical plane relative to the laminated optical waveguide film surface.

(9) The optical waveguide module according to (8), wherein a connector to which an optical fiber array can connect is provided at an end part at which the vertical plane is formed.

(10) A method of producing the laminated optical waveguide film according to (1), comprising: preparing two ridge waveguides in which a waveguide core is formed on a clad film, arranging the two ridge waveguides so that the waveguide cores are opposed to each other and a gap therebetween is controlled, filling a clad curable resin having a refractive index identical or approximately equivalent to that of the clad film into the gap, and curing the filled clad curable resin.

(11) The method of producing a laminated optical waveguide film according to (10), which further comprises forming an end part at which waveguide cores of the lamination waveguide obtained by curing the filled clad curable resin, are laminated and to a vertical plane, and forming an optical path conversion mirror at an end part at which waveguide cores are arranged in parallel.

(12) A method of producing the laminated optical waveguide film according to (1), comprising: preparing a plurality of embedded waveguides in which a waveguide core is formed between two clad films, arranging a plurality of embedded waveguides by controlling a gap on a lamination side thereof, filling a clad curable resin having a refractive index identical or approximately equivalent to that of the clad films, into the gap on the lamination side, and curing the filled clad curable resin.

(13) The method of producing the laminated optical waveguide film according to (12), which further comprises forming an end part at which waveguide cores of the lamination waveguide obtained by curing the filled clad curable resin are laminated and to a vertical plane, and forming an optical path conversion mirror at an end part at which waveguide cores are arranged in parallel.

(14) A method of producing the laminated optical waveguide film according to (3), comprising: preparing a plurality of embedded waveguides in which a waveguide core is formed between two clad films, a vertical plane is formed at a lamination side end part, and an optical path conversion mirror is formed on a monolayer-arranged side, arranging the plurality of embedded waveguides by controlling a gap on a lamination side thereof, filling a clad curable resin having a refractive index identical or approximately equivalent to that of the clad film, into the gap on the lamination side, and curing the filled clad curable resin.

What is claimed is:

1. A laminated optical waveguide film, comprising;
a plurality of waveguide cores, and
a plurality of end surfaces at which the waveguide cores are exposed,
wherein, among the plurality of end surfaces, a first end surface has the waveguide core end surfaces laminated in a thickness direction, wherein at the first end surface, a first portion of the plurality of waveguide cores form an upper waveguide, the first portion of the plurality of waveguide cores being arranged in parallel and associated with at least a first clad film, and a second portion of the plurality of waveguide cores form a lower waveguide, the second portion of the plurality of waveguide cores being arranged in parallel and associated with at least a second clad film, the upper waveguide being above the lower waveguide, and a second end surface has the waveguide core end surfaces arranged in parallel, and a gap between the upper waveguide and the lower waveguide, wherein at least at the first end surface, the gap is maintained by a spacer layer, and
wherein each waveguide core is sandwiched between two clad films.

2. The laminated optical waveguide film according to claim 1, wherein the second end surface is an optical path conversion mirror.

3. The laminated optical waveguide film according to claim 2, wherein the first end surface is a vertical plane relative to a laminated optical waveguide film surface.

4. A optical waveguide module, comprising;
a laminated optical waveguide film having a plurality of waveguide cores and a plurality of end surfaces at which the waveguide cores are exposed, wherein, among the plurality of end surfaces, a first end surface has waveguide core end surfaces laminated in a thickness direction, wherein at the first end surface, a first portion of the plurality of waveguide cores form an upper waveguide, the first portion of the plurality of waveguide cores being arranged in parallel and associated with at least a first clad film, and a second portion of the plurality of waveguide cores form a lower waveguide, the second portion of the plurality of waveguide cores being arranged in parallel and associated with at least a second clad film, the upper waveguide being above the lower waveguide, and a second end surface has waveguide core end surfaces arranged in parallel,
at least one of a planar light emitting element and a planar light receiving element connected to the second end surface, and
a gap between the upper waveguide and the lower waveguide, wherein at least at the first end surface, the gap is maintained by a spacer layer, and
wherein each waveguide core is sandwiched between two clad films.

5. The optical waveguide module according to claim 4, wherein the second end surface is an optical path conversion mirror.

6. The optical waveguide module according to claim 5, wherein at least one of the planar light emitting element and the planar light receiving element is directly adhered to the end surface not via a lens.

7. The optical waveguide module according to claim 6, wherein the planar light emitting element is a vertical cavity surface emission laser.

8. The optical waveguide module according to claim 5, wherein the first end surface is a vertical plane relative to the laminated optical waveguide film surface.

9. The optical waveguide module according to claim 8, wherein a connector to which an optical fiber array can connect is provided at an end part at which the vertical plane is formed.

10. A method of producing the laminated optical waveguide film according to claim 1, comprising:
preparing two ridge waveguides in which a waveguide core is formed on a clad film,
arranging the two ridge waveguides so that the waveguide cores are opposed to each other and a gap therebetween is controlled,
filling a clad curable resin having a refractive index identical or approximately equivalent to that of the clad film into the gap, and
curing the filled clad curable resin.

11. The method of producing a laminated optical waveguide film according to claim 10, which further comprises;
   forming an end part at which waveguide cores of the lamination waveguide obtained by curing the filled clad curable resin are laminated as a vertical plane, and forming an optical path conversion mirror at an end part at which waveguide cores are arranged in parallel.

12. A method of producing the laminated optical waveguide film according to claim 1, comprising:
   preparing a plurality of embedded waveguides in which a waveguide core is formed between two clad films,
   arranging the plurality of embedded waveguides by controlling a gap on a lamination side thereof,
   filling a clad curable resin having a refractive index identical or approximately equivalent to that of the clad films, into the gap on the lamination side, and
   curing the filled clad curable resin.

13. The method of producing the laminated optical waveguide film according to claim 12, which further comprises:
   forming an end part at which waveguide cores of the lamination waveguide obtained by curing the filled clad curable resin are laminated as a vertical plane, and
   forming an optical path conversion mirror at an end part at which waveguide cores are arranged in parallel.

14. A method of producing the laminated optical waveguide film according to claim 3, comprising:
   preparing a plurality of embedded waveguides in which a waveguide core is formed between two clad films, a vertical plane is formed at a lamination side end part, and an optical path conversion mirror is formed on parallel-arranged side,
   arranging the plurality of embedded waveguides by controlling a gap on a lamination side thereof,
   filling a clad curable resin having a refractive index identical or approximately equivalent to that of the clad film, into the gap on the lamination side, and
   curing the filled clad curable resin.

\* \* \* \* \*